United States Patent
Venugopal et al.

(10) Patent No.: US 11,638,167 B2
(45) Date of Patent: Apr. 25, 2023

(54) TECHNIQUES FOR SET BASED BEAM REPORTING

(71) Applicant: QUALCOMM Incorporated, San Diego, CA (US)

(72) Inventors: Kiran Venugopal, Raritan, NJ (US); Yan Zhou, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/949,764

(22) Filed: Nov. 13, 2020

(65) Prior Publication Data

US 2021/0235298 A1     Jul. 29, 2021

Related U.S. Application Data

(60) Provisional application No. 62/967,411, filed on Jan. 29, 2020.

(51) Int. Cl.
*H04W 24/10*     (2009.01)
*H04W 16/28*     (2009.01)

(52) U.S. Cl.
CPC ........... *H04W 24/10* (2013.01); *H04W 16/28* (2013.01)

(58) Field of Classification Search
CPC .... H04B 7/0695; H04W 24/10; H04W 16/28; H04W 36/30; H04W 72/046; H04W 72/0413
See application file for complete search history.

(56) References Cited

U.S. PATENT DOCUMENTS

| | | | |
|---|---|---|---|
| 2016/0007261 A1* | 1/2016 | Oh | H04B 7/0695 455/438 |
| 2018/0034612 A1 | 2/2018 | Lin et al. | |
| 2018/0351668 A1 | 12/2018 | Kim | |
| 2019/0305838 A1 | 10/2019 | Davydov et al. | |
| 2019/0349151 A1* | 11/2019 | Zhang | H04W 72/0446 |
| 2019/0373627 A1* | 12/2019 | Luo | H04W 72/1226 |
| 2019/0380082 A1* | 12/2019 | Kim | H04W 36/0058 |
| 2020/0382184 A1* | 12/2020 | Shimizu | H04B 17/24 |

OTHER PUBLICATIONS

International Search Report and Written Opinion—PCT/US2020/067734—ISA/EPO—dated Mar. 24, 2021.

\* cited by examiner

*Primary Examiner* — Anez C Ebrahim
(74) *Attorney, Agent, or Firm* — Dalei Dong; Harrity & Harrity, LLP

(57) ABSTRACT

Various aspects of the present disclosure generally relate to techniques for set based beam reporting. In some aspects, a user equipment (UE) may receive, from a base station, an indication of one or more sets of candidate beams, where each set of candidate beams includes a first beam combination and a second beam combination. The first beam combination may include a first beam as a channel measurement resource (CMR) and a second beam as an interference measurement resource (IMR), and the second beam combination may include the second beam as a CMR and the first beam as an IMR. The UE may determine measurement values for beam combinations in the sets and determine a candidate set to report based at least in part on the measurement values. The UE may transmit a measurement report with measurement values for the first and second beam combinations of the candidate set.

28 Claims, 10 Drawing Sheets

TECHNIQUES FOR SET BASED BEAM REPORTING

CROSS-REFERENCE TO RELATED APPLICATION

This Patent application claims priority to U.S. Provisional patent Application No. 62/967,411, filed on Jan. 29, 2020, entitled "TECHNIQUES FOR SET BASED BEAM REPORTING," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for set based beam reporting.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station, an indication of one or more sets of candidate beams. Each set of candidate beams may include a first beam combination and a second beam combination, the first beam combination including a first beam as a channel measurement resource (CMR) and a second beam as an interference measurement resource (IMR) for measuring interference by the second beam on the first beam, and the second beam combination including the second beam as a CMR and the first beam as an IMR. The method may include determining, for each of the one or more sets of candidate beams, a measurement value for the first beam combination and a measurement value for the second beam combination, and determining a candidate set of beams, of the one or more sets of candidate beams, to report based at least in part on the measurement values. The method may include transmitting, to the base station, a measurement report indicating a first measurement value for the first beam combination of the candidate set of beams and a second measurement value for the second beam combination of the candidate set of beams.

In some aspects, the first measurement value and the second measure value include a signal to interference plus noise ratio for a respective beam combination.

In some aspects, the indication indicates the one or more sets of candidate beams based at least in part on how beam combinations are ordered in the indication.

In some aspects, the method includes receiving a message from the base station, the message defining how an order of the beam combinations indicates the one or more sets of candidate beams.

In some aspects, the measurement report indicates the candidate set with an identifier for the candidate set.

In some aspects, the measurement report indicates one or more of a resource indicator for an associated channel state information reference signal or a resource indicator for an associated synchronization signal block or physical broadcast channel.

In some aspects, the measurement report indicates the candidate set with an identifier for the CMR of the first beam combination of the candidate set.

In some aspects, a method of wireless communication, performed by a base station, may include determining one or more sets of candidate beams for transmitting communications to a UE. Each set of candidate beams may include a first beam combination and a second beam combination, the first beam combination including a first beam as a CMR and a second beam as an IMR for measuring interference by the second beam on the first beam, and the second beam combination including the second beam as a CMR and the first beam as an IMR. The method may include transmitting an indication of the one or more sets of candidate beams to the UE, and receiving a measurement report from the UE, the measurement report indicating a first measurement value for a first beam combination of a candidate set of beams of the one or more sets of candidate beams, and a second measurement value for a second beam combination of the candidate set of beams.

In some aspects, the first measurement value and the second measure value include a signal to interference plus noise ratio for a respective beam combination.

In some aspects, alone or in combination with the first aspect, the indication indicates the one or more sets of candidate beams based at least in part on how beam combinations are ordered in the indication.

In some aspects, the method includes transmitting a message to the UE, the message defining how an order of the beam combinations indicates the one or more sets of candidate beams.

In some aspects, the measurement report indicates the candidate set with an identifier for the candidate set.

In some aspects, the measurement report indicates one or more of a resource indicator for an associated channel state information reference signal or a resource indicator for an associated synchronization signal block or physical broadcast channel.

In some aspects, the measurement report indicates the candidate set with an identifier for the CMR of the first combination of the candidate set.

In some aspects, a UE for wireless communication may include memory and one or more processors operatively coupled to the memory. The memory and the one or more processors may be configured to receive, from a base station, an indication of one or more sets of candidate beams. Each set of candidate beams may include a first beam combination and a second beam combination, the first beam combination including a first beam as a CMR and a second beam as an IMR for measuring interference by the second beam on the first beam, and the second beam combination including the second beam as a CMR and the first beam as an IMR. The memory and the one or more processors may be configured to determine, for each of the one or more sets of candidate beams, a measurement value for the first beam combination and a measurement value for the second beam combination, determine a candidate set of beams, of the one or more sets of candidate beams, to report based at least in part on the measurement values, and transmit, to the base station, a measurement report indicating a first measurement value for the first beam combination of the candidate set of beams and a second measurement value for the second beam combination of the candidate set of beams.

In some aspects, the first measurement value and the second measure value include a signal to interference plus noise ratio for a respective beam combination.

In some aspects, the indication indicates the one or more sets of candidate beams based at least in part on how beam combinations are ordered in the indication.

In some aspects, the memory and the one or more processors are configured to receive a message from the base station, the message defining how an order of the beam combinations indicates the one or more sets of candidate beams.

In some aspects, the measurement report indicates the candidate set with an identifier for the candidate set.

In some aspects, the measurement report indicates one or more of a resource indicator for an associated channel state information reference signal or a resource indicator for an associated synchronization signal block or physical broadcast channel.

In some aspects, the measurement report indicates the candidate set with an identifier for the CMR of the first beam combination of the candidate set.

In some aspects, a base station for wireless communication may include memory and one or more processors operatively coupled to the memory. The memory and the one or more processors may be configured to determine one or more sets of candidate beams for transmitting communications to a UE. Each set of candidate beams may include a first beam combination and a second beam combination, the first beam combination including a first beam as a CMR and a second beam as an IMR for measuring interference by the second beam on the first beam, and the second beam combination including the second beam as a CMR and the first beam as an IMR. The memory and the one or more processors may be configured to transmit an indication of the one or more sets of candidate beams to the UE, and receive a measurement report from the UE, the measurement report indicating a first measurement value for a first beam combination of a candidate set of beams of the one or more sets of candidate beams, and a second measurement value for a second beam combination of the candidate set of beams.

In some aspects, the first measurement value and the second measure value include a signal to interference plus noise ratio for a respective beam combination.

In some aspects, alone or in combination with the first aspect, the indication indicates the one or more sets of candidate beams based at least in part on how beam combinations are ordered in the indication.

In some aspects, the memory and the one or more processors may be configured to transmit a message to the UE, the message defining how an order of the beam combinations indicates the one or more sets of candidate beams.

In some aspects, the measurement report indicates the candidate set with an identifier for the candidate set.

In some aspects, the measurement report indicates one or more of a resource indicator for an associated channel state information reference signal or a resource indicator for an associated synchronization signal block or physical broadcast channel.

In some aspects, the measurement report indicates the candidate set with an identifier for the CMR of the first combination of the candidate set.

In some aspects, a non-transitory computer-readable medium may store one or more instructions for wireless communication. The one or more instructions, when executed by one or more processors of a UE, may cause the one or more processors to receive, from a base station, an indication of one or more sets of candidate beams, where each set of candidate beams includes a first beam combination and a second beam combination, the first beam combination including a first beam as a CMR and a second beam as an IMR for measuring interference by the second beam on the first beam, and the second beam combination including the second beam as a CMR and the first beam as an IMR, determine, for each of the one or more sets of candidate beams, a measurement value for the first beam combination and a measurement value for the second beam combination, determine a candidate set of beams, of the one or more sets of candidate beams, to report based at least in part on the measurement values, and transmit, to the base station, a measurement report indicating a first measurement value for the first beam combination of the candidate set of beams and a second measurement value for the second beam combination of the candidate set of beams.

In some aspects, the first measurement value and the second measure value include a signal to interference plus noise ratio for a respective beam combination.

In some aspects, the indication indicates the one or more sets of candidate beams based at least in part on how beam combinations are ordered in the indication.

In some aspects, the one or more instructions, when executed by the one or more processors of the UE, may cause the one or more processors to receive a message from the base station, the message defining how an order of the beam combinations indicates the one or more sets of candidate beams.

In some aspects, the measurement report indicates the candidate set with an identifier for the candidate set.

In some aspects, the measurement report indicates one or more of a resource indicator for an associated channel state information reference signal or a resource indicator for an associated synchronization signal block or physical broadcast channel.

In some aspects, the measurement report indicates the candidate set with an identifier for the CMR of the first beam combination of the candidate set.

In some aspects, a non-transitory computer-readable medium may store one or more instructions for wireless communication. The one or more instructions, when executed by one or more processors of a base station, may cause the one or more processors to determine one or more sets of candidate beams for transmitting communications to a UE, where each set of candidate beams includes a first beam combination and a second beam combination, the first beam combination including a first beam as a CMR and a second beam as an IMR for measuring interference by the second beam on the first beam, and the second beam combination including the second beam as a CMR and the first beam as an IMR, transmit an indication of the one or more sets of candidate beams to the UE, and receive a measurement report from the UE, the measurement report indicating a first measurement value for a first beam combination of a candidate set of beams of the one or more sets of candidate beams, and a second measurement value for a second beam combination of the candidate set of beams.

In some aspects, the first measurement value and the second measure value include a signal to interference plus noise ratio for a respective beam combination.

In some aspects, alone or in combination with the first aspect, the indication indicates the one or more sets of candidate beams based at least in part on how beam combinations are ordered in the indication.

In some aspects, the one or more instructions, when executed by the one or more processors of the base station, may cause the one or more processors to transmit a message to the UE, the message defining how an order of the beam combinations indicates the one or more sets of candidate beams.

In some aspects, the measurement report indicates the candidate set with an identifier for the candidate set.

In some aspects, the measurement report indicates one or more of a resource indicator for an associated channel state information reference signal or a resource indicator for an associated synchronization signal block or physical broadcast channel.

In some aspects, the measurement report indicates the candidate set with an identifier for the CMR of the first combination of the candidate set.

In some aspects, an apparatus for wireless communication may include means for receiving, from a base station, an indication of one or more sets of candidate beams, where each set of candidate beams includes a first beam combination and a second beam combination, the first beam combination including a first beam as a CMR and a second beam as an IMR for measuring interference by the second beam on the first beam, and the second beam combination including the second beam as a CMR and the first beam as an IMR, means for determining, for each of the one or more sets of candidate beams, a measurement value for the first beam combination and a measurement value for the second beam combination, means for determining a candidate set of beams, of the one or more sets of candidate beams, to report based at least in part on the measurement values, and means for transmitting, to the base station, a measurement report indicating a first measurement value for the first beam combination of the candidate set of beams and a second measurement value for the second beam combination of the candidate set of beams.

In some aspects, the first measurement value and the second measure value include a signal to interference plus noise ratio for a respective beam combination.

In some aspects, the indication indicates the one or more sets of candidate beams based at least in part on how beam combinations are ordered in the indication.

In some aspects, the apparatus includes means for receiving a message from the base station, the message defining how an order of the beam combinations indicates the one or more sets of candidate beams.

In some aspects, the measurement report indicates the candidate set with an identifier for the candidate set.

In some aspects, the measurement report indicates one or more of a resource indicator for an associated channel state information reference signal or a resource indicator for an associated synchronization signal block or physical broadcast channel.

In some aspects, the measurement report indicates the candidate set with an identifier for the CMR of the first beam combination of the candidate set.

In some aspects, an apparatus for wireless communication may include means for determining one or more sets of candidate beams for transmitting communications to a UE, where each set of candidate beams includes a first beam combination and a second beam combination, the first beam combination including a first beam as a CMR and a second beam as an IMR for measuring interference by the second beam on the first beam, and the second beam combination including the second beam as a CMR and the first beam as an IMR, means for transmitting an indication of the one or more sets of candidate beams to the UE, and means for receiving a measurement report from the UE, the measurement report indicating a first measurement value for a first beam combination of a candidate set of beams of the one or more sets of candidate beams, and a second measurement value for a second beam combination of the candidate set of beams.

In some aspects, the first measurement value and the second measure value include a signal to interference plus noise ratio for a respective beam combination.

In some aspects, alone or in combination with the first aspect, the indication indicates the one or more sets of candidate beams based at least in part on how beam combinations are ordered in the indication.

In some aspects, the apparatus includes means for transmitting a message to the UE, the message defining how an order of the beam combinations indicates the one or more sets of candidate beams.

In some aspects, the measurement report indicates the candidate set with an identifier for the candidate set.

In some aspects, the measurement report indicates one or more of a resource indicator for an associated channel state information reference signal or a resource indicator for an associated synchronization signal block or physical broadcast channel.

In some aspects, the measurement report indicates the candidate set with an identifier for the CMR of the first combination of the candidate set.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
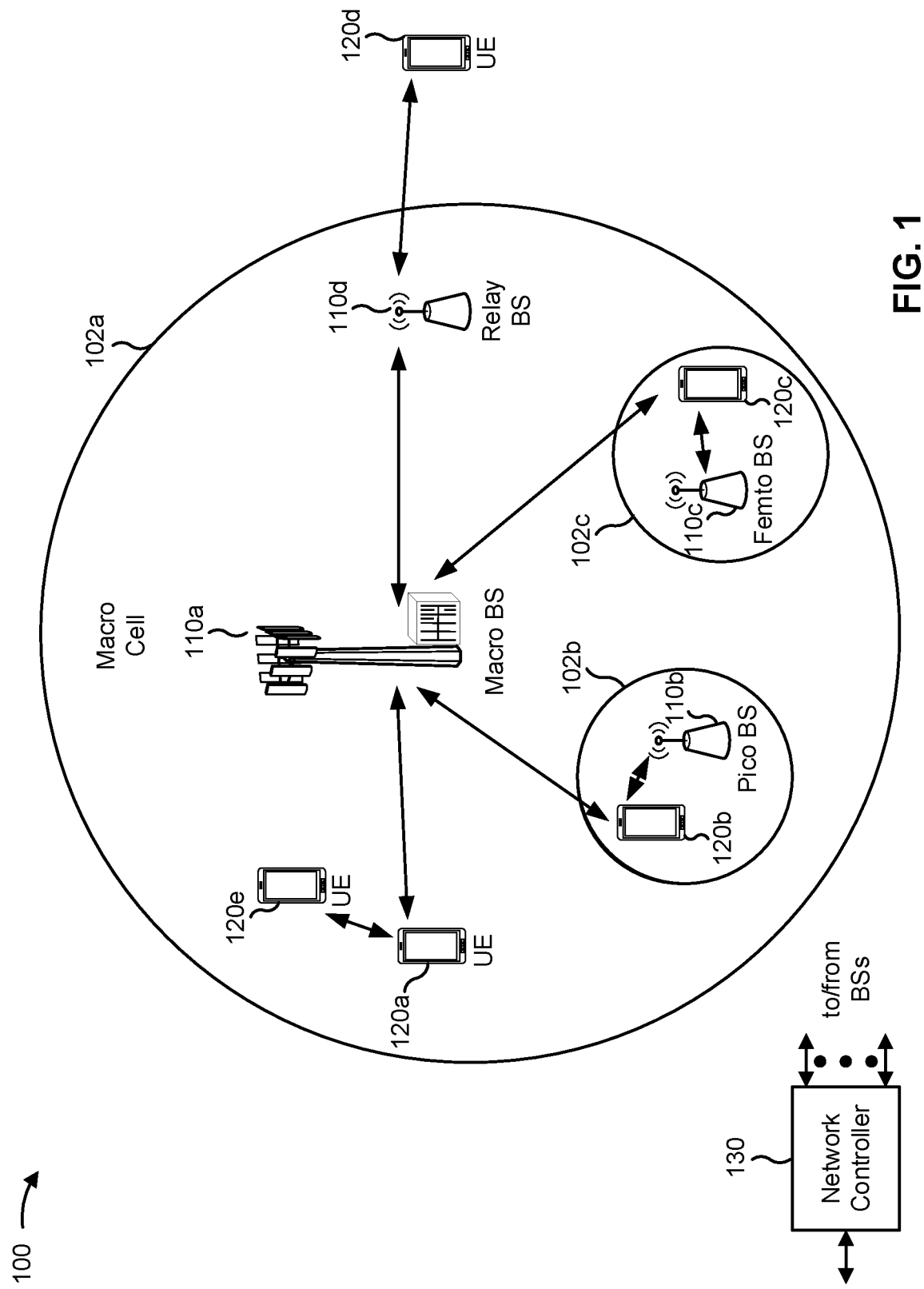
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
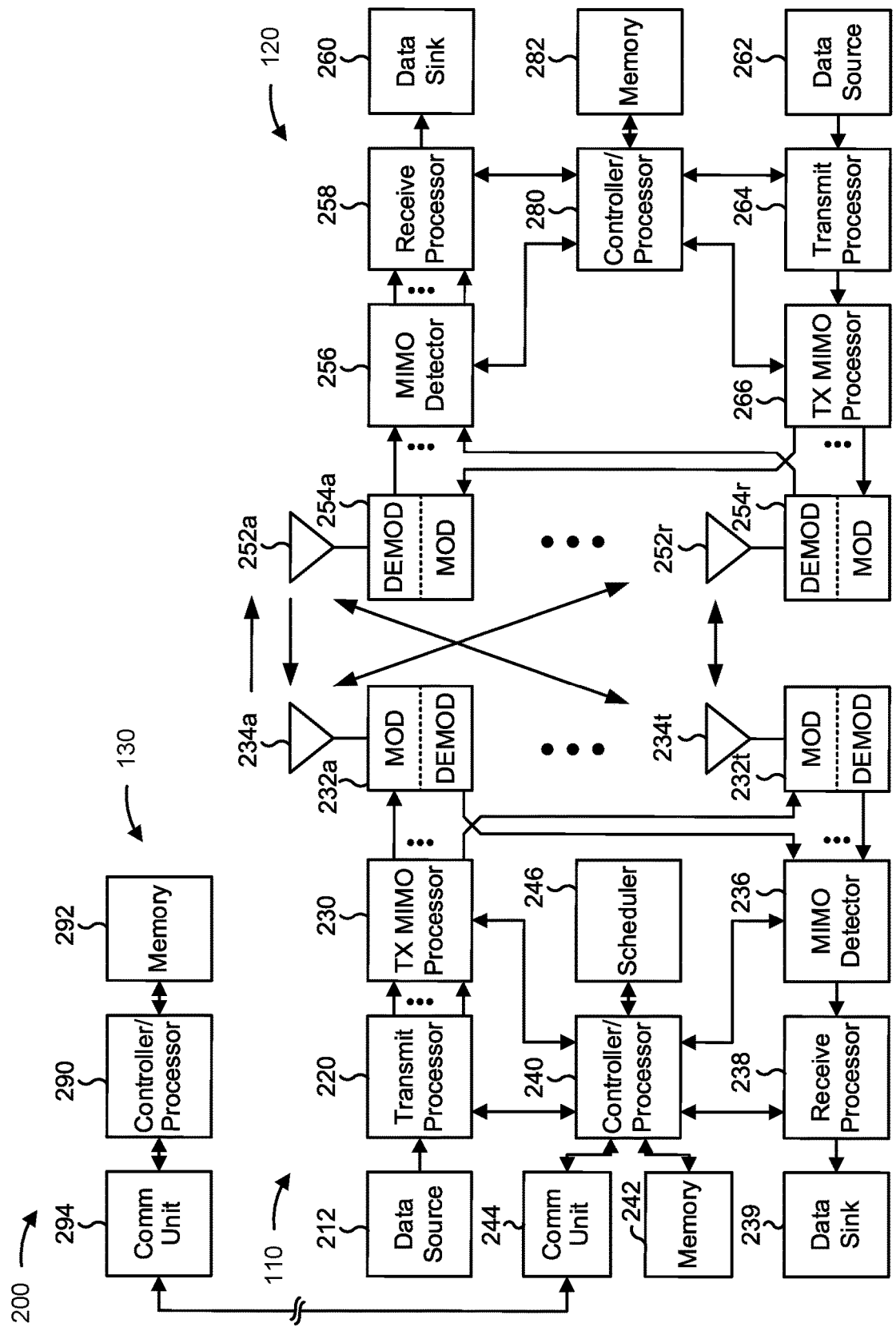
FIG. 2 is a diagram illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with indicating beams for user equipment beam reporting, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7, process 800 of FIG. 8, and/or other processes as described herein. A scheduler 246 may schedule UEs for data transmission on the downlink and/or uplink.

In some aspects, a candidate beam may comprise a channel state information reference signal (CSI-RS) resource and/or a synchronization signal block (SSB) resource. A resource may have associated transmission configuration indicator states, spatial filter parameters, and/or quasi-colocation properties. For ease of explanation, such a resource may be referred to as a beam in the examples described herein.

In some aspects, UE 120 may include means for receiving, from a base station, an indication of one or more sets of candidate beams, where each set of candidate beams includes a first beam combination and a second beam combination, the first beam combination including a first beam as a channel measurement resource (CMR) and a second beam as an interference measurement resource (IMR) for measuring interference by the second beam on the first beam, and the second beam combination including the second beam as a CMR and the first beam as an IMR, means for determining, for each of the one or more sets of candidate beams, a measurement value for the first beam combination and a measurement value for the second beam combination, means for determining a candidate set of beams, of the one or more sets of candidate beams, to report based at least in part on the measurement values, means for transmitting, to the base station, a measurement report indicating a first measurement value for the first beam combination of the candidate set of beams and a second measurement value for the second beam combination of the candidate set of beams, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining one or more sets of candidate beams for transmitting communications to a UE, where each set of candidate beams includes a first beam combination and a second beam combination, the first beam combination including a first beam as a CMR and a second beam as an IMR for measuring interference by the second beam on the first beam, and the second beam combination including the second beam as a CMR and the first beam as an IMR, means for transmitting an indication of the one or more sets of candidate beams to the UE, means for receiving a measurement report from the UE, the measurement report indicating a first measurement value for a first beam combination of a candidate set of beams of the one or more sets of candidate beams, and a second measurement value for a second beam combination of the candidate set of beams, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
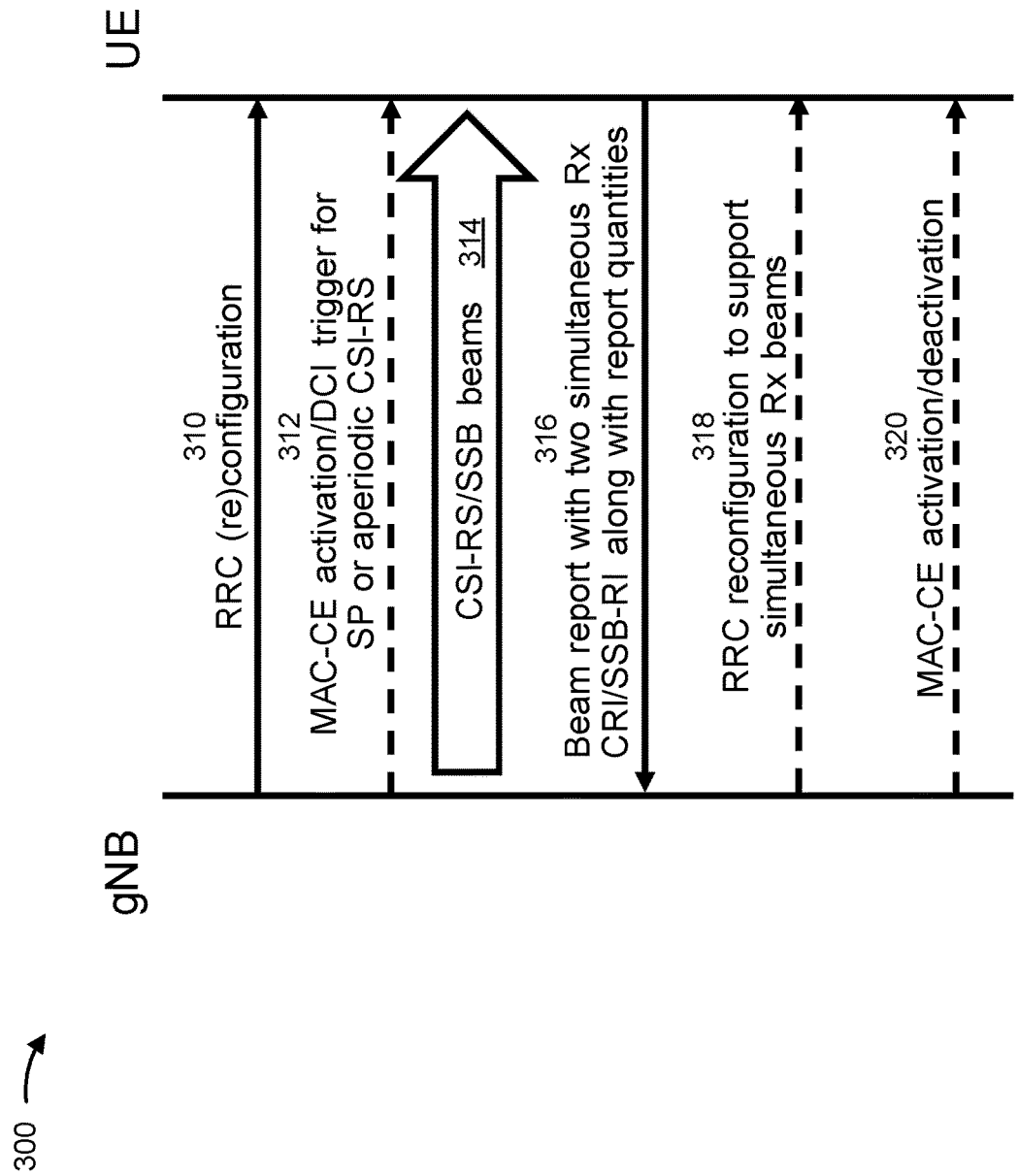
FIG. 3 illustrates an example procedure for beam reporting by a UE for simultaneous beam communications.

FIG. 3 illustrates an example procedure 300 for beam reporting by a UE for simultaneous beam communications. A base station (e.g., gNB) may plan to transmit on two beams simultaneously, and a corresponding UE may plan to receive on the two beams simultaneously. Accordingly, the gNB and the UE may begin to establish communications via a radio resource control (RRC) configuration message (e.g., CSI-MeasConfig, CSI-ReportConfig, CSI-ResourceConfig), as shown by reference number 310. The gNB may transmit a medium access control control element (MAC-CE) or use a downlink control information (DCI) trigger to activate semi-persistent or aperiodic channel state information reference signals (CSI-RSs), as shown by reference number 312. The base station may transmit the CSI-RSs or synchronization signal blocks (SSBs) on a plurality of beams, as shown by reference number 314. The UE may measure the beams and report, to the gNB, channel information and/or interference information. The UE may report the channel information and/or interference information. For example, the UE may report CSI-RS resource indicator (CRIs) or synchronization signal physical broadcast channel (SS/PBCH) resource block indicators (SSB-RIs) in a message, as shown by reference number 316. The message may also include an associated report quantity (e.g., RSRP or signal to interference plus noise ratio (SINR)). The gNB may transmit an RRC reconfiguration message to the UE, as shown by reference number 318, based on the report from the UE, and transmit a MAC-CE activation or deactivation message, as shown by reference number 320. The gNB may then transmit communications to the UE on the first beam and the second beam simultaneously. The two beams may belong to the same transmission and reception point (TRP) or to different TRPs. A TRP may be associated with a set of beams.

As indicated above, FIG. 3 is provided as an example. Other examples may differ from what is described with regard to FIG. 3.

A UE may determine for which candidate beams to report measurement information. The UE may measure beams independently and report measurements (e.g., RSRP) for an individual beam or a set of beams. If the UE is to measure beams jointly, the UE may use Layer 1 signal to interference plus noise ratio (L1-SINR) as a metric, which takes into account cross-beam interference. Specifically, the UE may compute L1-SINR per beam based at least in part on a channel measurement resource (CMR) for a signal part and an interference measurement resource (IMR) for an interference plus noise part. For example, the UE may measure one beam for the CMR part and another beam for the IMR part. The two beams (one for CMR and one for IMR) may be considered a beam combination.

The UE may determine to report a beam with a highest L1-SINR. However, the report may not reflect cross-interference between the beam and another beam, because the corresponding IMRs may be configured to be transmitted by beams other than the beams for which the UE may report. The report may lead to less accurate channel and interference information, which may degrade decision making by a transmitting device and degrade transmission quality. Degraded transmissions may cause the UE and the BS to waste processing resources and signaling resources on unsuccessful transmissions or retransmissions.

According to various aspects describe herein, the BS may provide sets of candidate beams (beam groups) to the UE for reporting. The UE may report measurements for all beam combinations in a determined set of candidate beams. Each set may include two beam combinations. A first beam combination may include a first beam for CMR and a second beam for IMR. A second beam combination for the same set may include the second beam for CMR and the first beam for IMR. In this way, the UE may report for the candidate beam set (beam and interfering beam), rather than for a single beam. As a result, the BS may obtain more information that accounts for cross-beam interference. The information for the candidate beam set may lead to more accurate channel and interference information, which may improve decision making by the transmitting device and improve transmission quality. Improved transmission quality may cause the UE and the BS to conserve processing resources and signaling resources that would otherwise be wasted on unsuccessful transmissions or retransmissions.

Figure 4:
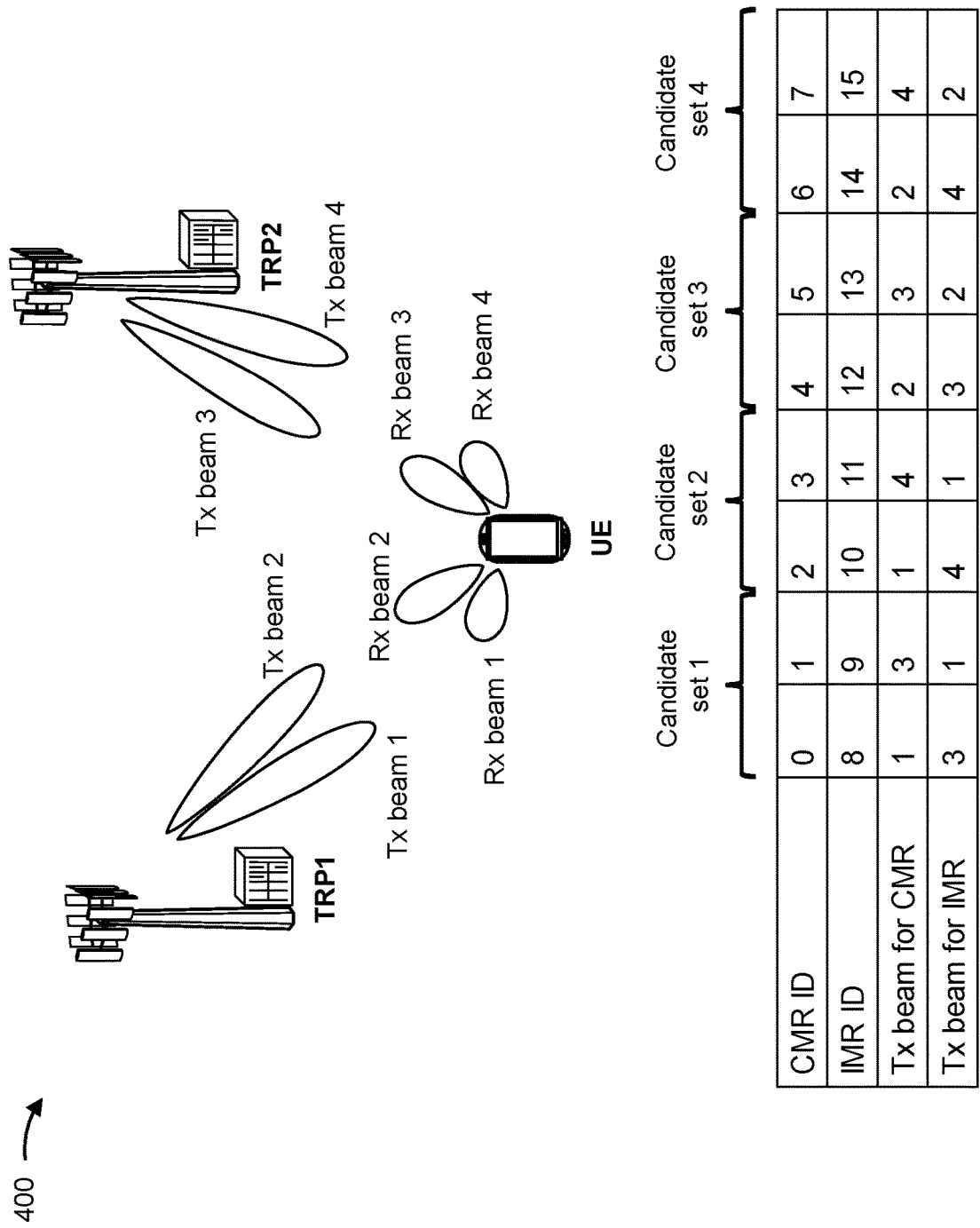
FIG. 4 illustrates an example of beam combinations in sets of candidate beams, in accordance with various aspects of the present disclosure.

FIG. 4 illustrates an example 400 of beam combinations in sets of candidate beams, in accordance with various aspects of the present disclosure. In some aspects, a BS (e.g., TRP, gNB) may provide a plurality of sets of candidate beams. FIG. 4 shows a table with 8 columns, where each column is a beam combination that is specified, for example, with a CMR identifier (ID) and an IMR ID. In the first beam combination, a CMR ID of 0 and an IMR ID of 8 indicates that beam 1 is the beam for CMR and that beam 3 is the beam for IMR. In the second beam combination, a CMR ID of 1 and an IMR ID of 9 indicates that beam 3 is the beam for CMR and that beam 1 is the beam for IMR. There are 8 columns, or 8 beam combinations, in this example. A UE may report any individual beam combination, but without a full consideration of cross-beam interference.

In some aspects, the BS may indicate one or more sets of candidate beams, where each set is two beam combinations as discussed above. For example, the first beam combination of beam 1 for CMR and beam 3 for IMR is in candidate set 1 with the second beam combination of beam 3 for CMR and beam 1 for IMR. Therefore, if the UE measures one of these beam combinations and determines to report a beam combination (e.g., high SINR relative to SINR of other beam combinations), rather than reporting the individual high SINR beam combination, the UE may report both beam combinations for the set in which the high SINR beam combination resides. In this way, the BS may determine the cross-beam interference involved between the two beams of candidate set 1. The cross-beam interference may lead the BS to determine that selecting beam 1 and beam 3 may not be as optimal for simultaneous transmission, and the BS may select a pair of beams from other candidate sets for communication.

FIG. 4 shows four candidate sets, and not all possible beam combinations are represented. The BS may be selective in what candidate sets of beam combinations to provide to the UE. The BS may determine the candidate sets based at least in part on a UE capability, a UE location, a UE speed, a UE direction, a predicted location of the UE, and/or the like. Other metrics for measurement may include L1-SINR, L1-RSRP, a channel quality indicator, a throughput, mutual information between beams, and/or the like. While a candidate set of beams is described as having two beam combinations, in some aspects, a candidate set may include more than two beam combinations. In some aspects, a beam combination may include a CMR and IMR configuration of more than two beams.

As indicated above, FIG. 4 is provided as an example. Other examples may differ from what is described with regard to FIG. 4.

Figure 5:
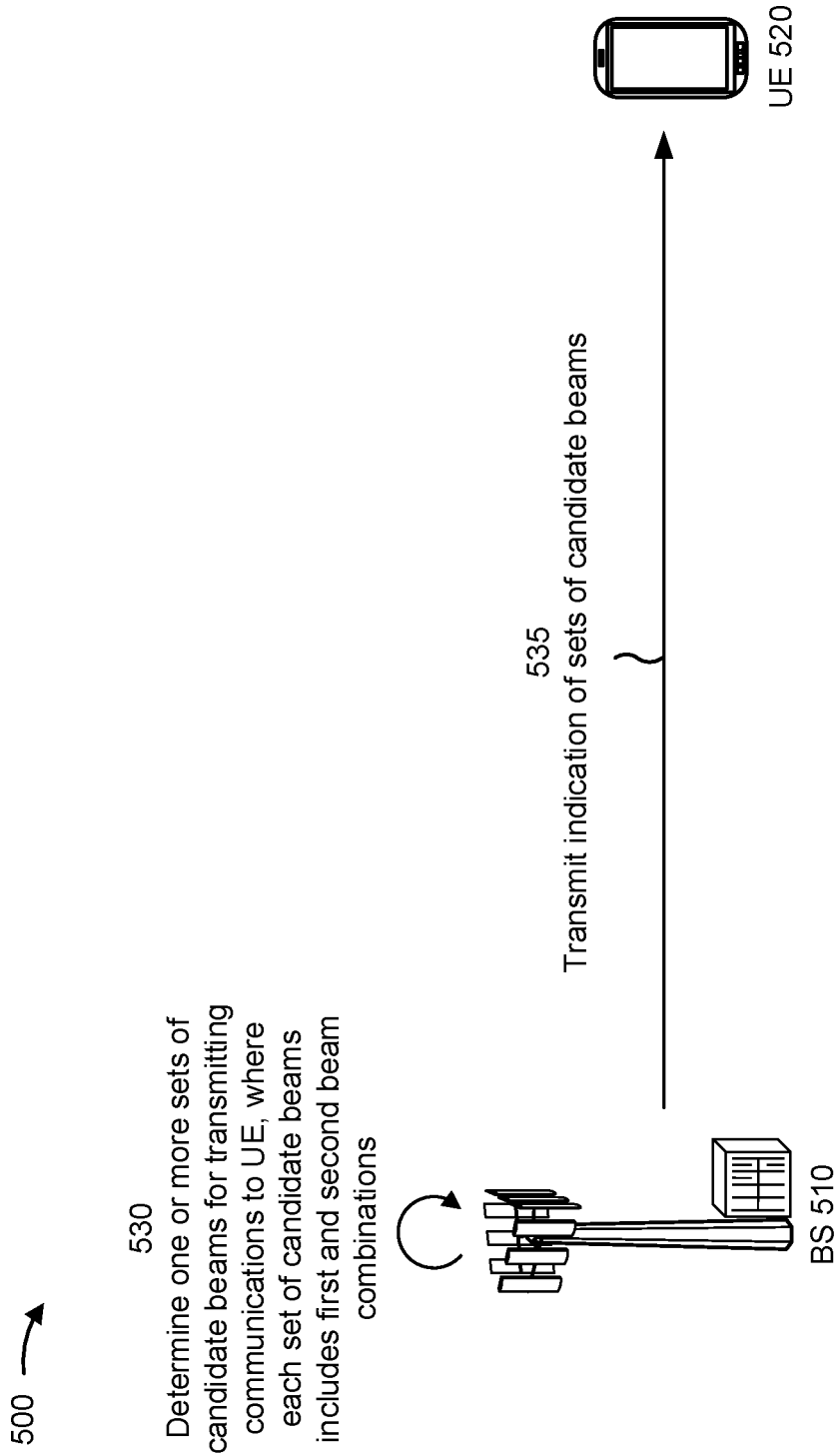
FIGS. 5 and 6 are diagrams that illustrate an example of indicating beams for UE beam reporting, in accordance with various aspects of the present disclosure.
Figure 6:
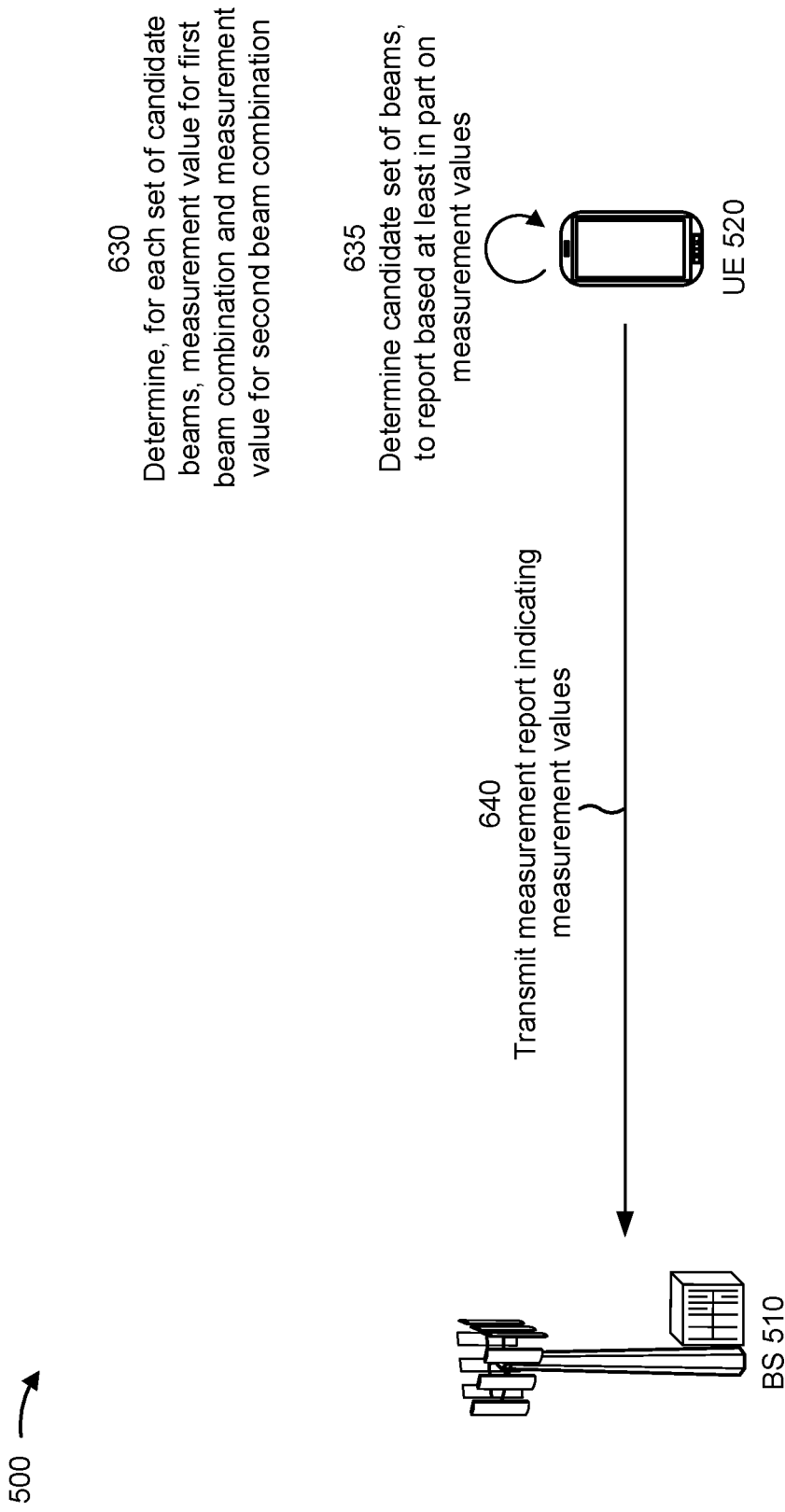

FIGS. 5 and 6 are diagrams that illustrate an example 500 of indicating beams for UE beam reporting, in accordance with various aspects of the present disclosure. FIGS. 5 and 6 show a BS 510 (e.g., BS 110 depicted in FIGS. 1 and 2, the gNB depicted in FIG. 3, the TRPs depicted in FIG. 4) that may communicate with a UE 520 (e.g., UE 120 depicted in FIGS. 1 and 2, the UE depicted in FIGS. 3 and 4). BS 510 may transmit communications to UE 520 on at least two simultaneous beams.

As shown by FIG. 5, and by reference number 530, BS 510 may determine one or more sets of candidate beams for transmitting communications to UE 520. Each set of candidate beams may include a first beam combination and a second beam combination. The first beam combination may include a first beam as a CMR and a second beam as an IMR for measuring interference by the second beam on the first beam. The second beam combination may include the second beam as a CMR and the first beam as an IMR. BS 510 may determine the one or more sets of candidate beams, based at least in part on a capability of the UE, a location of the UE, a speed of the UE, a direction of the UE, a predicted location or path of the UE, feedback from the UE, and/or the like.

As shown by reference number 535, BS 510 may transmit an indication of the sets of candidate beams to UE 520. The indication may be an explicit resource identifier (CMR IDs, IMR IDs) or an explicit beam set identifier. Additionally, or alternatively, the indication may be an implicit identifier, where UE 520 may determine the one or more sets of candidate beams based at least in part on an implicit indication.

In some aspects, the beam combinations may be part of a list, and the UE may determine the one or more candidate sets based at least in part on the list and/or an order of beam combinations in the indication. For example, two adjacent resources or adjacent beam combinations may form each set of candidate beams. The UE may have received a message from the gNB configuring the UE with a list, ordering information, identifier information, and/or the like.

FIG. 6 shows a continuation of example 500. As shown by FIG. 6, and by reference number 630, UE 520 may determine measurements (e.g., L1-SINR, and/or the like) for beam combinations of CMR and IMR for one or more of the sets of beam candidates indicated by BS 510. It may be effective to measure beam combinations for each set of candidate beams. UE 520 may determine a beam combination to report (e.g., high L1-SINR). As shown by reference number 635, UE 520 may determine a candidate beam set for which to report measurement values, based at least in part on the measurement values. For example, UE 520 may determine to report both beam combinations for a candidate set which has a beam combination with a highest measured L1-SINR. In some aspects, a highest average of beam combinations may be considered. In some aspects, UE 520 may determine a candidate beam set to report based at least in part on maximizing a sum of L1-SINRs per beam among all sets of candidate beams.

As shown by reference number 640, UE 520 may transmit an indication of the measurement values to BS 510. The indication may also indicate information identifying the candidate beam set or beam combinations for the candidate beam set.

As indicated above, FIGS. 5 and 6 are provided as an example. Other examples may differ from what is described with regard to FIGS. 5 and 6.

Figure 7:
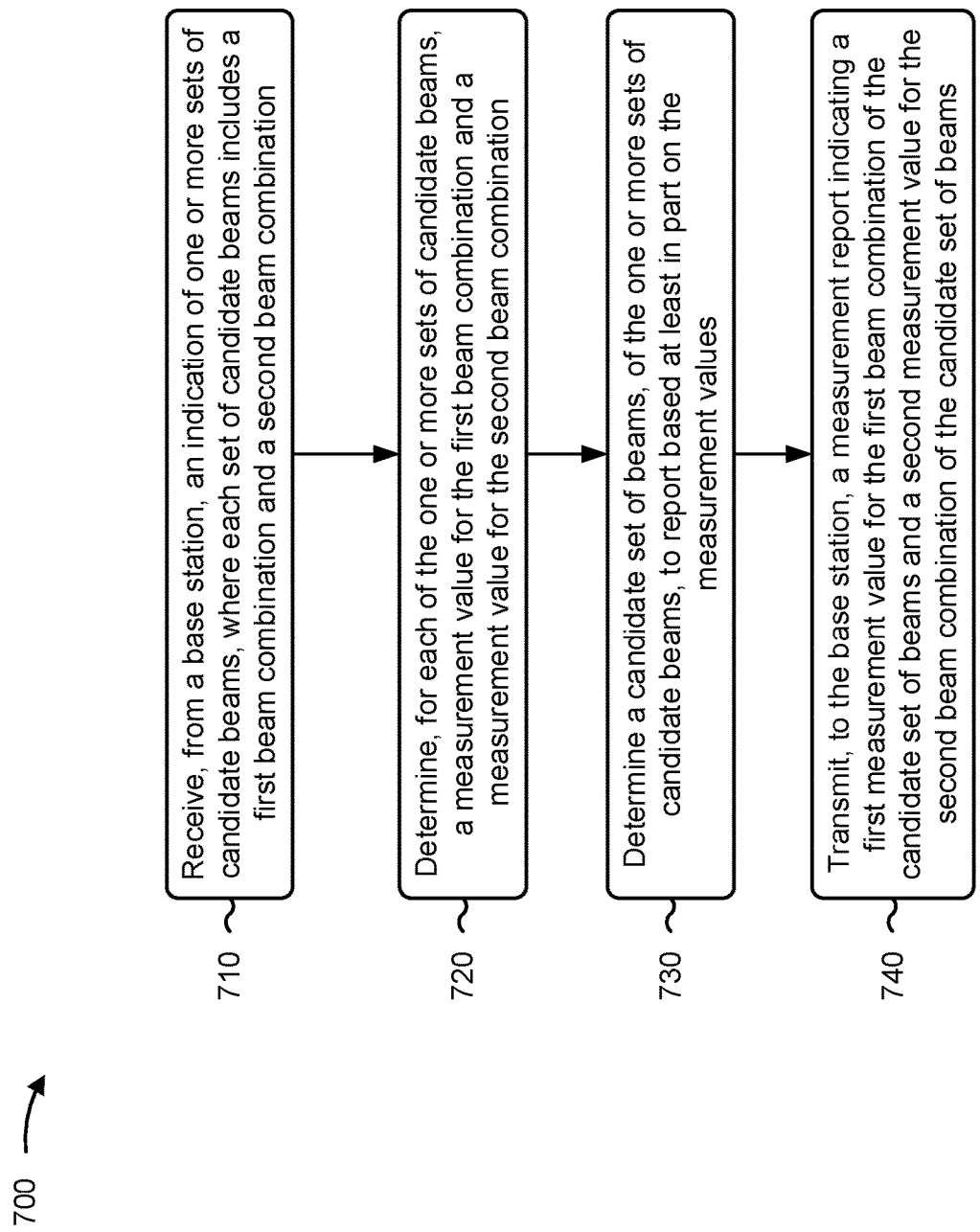
FIG. 7 is a diagram illustrating an example process performed, for example, by a UE, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 depicted in FIGS. 1 and 2, the UE depicted in FIGS. 3 and 4, UE 520 depicted in FIGS. 5 and 6, and/or the like) performs operations associated with techniques for set based beam reporting.

As shown in FIG. 7, in some aspects, process 700 may include receiving, from a base station, an indication of one or more sets of candidate beams (block 710). For example, the UE (e.g., using receive processor 258, transmit processor 264, controller/processor 280, memory 282, and/or the like) may receive, from a base station, an indication of one or more sets of candidate beams, as described above. In some aspects, the operation of block 710 may be performed by reception component 904 of FIG. 9. In some aspects, each set of candidate beams includes a first beam combination and a second beam combination, the first beam combination including a first beam as a CMR and a second beam as an IMR for measuring interference by the second beam on the first beam, and the second beam combination including the second beam as a CMR and the first beam as an IMR.

As further shown in FIG. 7, in some aspects, process 700 may include determining, for each of the one or more sets of candidate beams, a measurement value for the first beam combination and a measurement value for the second beam combination (block 720). For example, the UE (e.g., using receive processor 258, transmit processor 264, controller/processor 280, memory 282, and/or the like) may determine, for each of the one or more sets of candidate beams, a measurement value for the first beam combination and a measurement value for the second beam combination, as described above. In some aspects, the operation of block 720 may be performed by determination component 906 of FIG. 9.

As further shown in FIG. 7, in some aspects, process 700 may include determining a candidate set of beams, of the one or more sets of candidate beams, to report based at least in part on the measurement values (block 730). For example, the UE (e.g., using receive processor 258, transmit processor 264, controller/processor 280, memory 282, and/or the like) may determine a candidate set of beams, of the one or more sets of candidate beams, to report based at least in part on the measurement values, as described above. In some aspects, the operation of block 730 may be performed by determination component 906 of FIG. 9.

As further shown in FIG. 7, in some aspects, process 700 may include transmitting, to the base station, a measurement report indicating a first measurement value for the first beam combination of the candidate set of beams and a second measurement value for the second beam combination of the candidate set of beams (block 740). For example, the UE (e.g., using receive processor 258, transmit processor 264, controller/processor 280, memory 282, and/or the like) may transmit, to the base station, a measurement report indicating a first measurement value for the first beam combination of the candidate set of beams and a second measurement value for the second beam combination of the candidate set of beams, as described above. In some aspects, the operation of block 740 may be performed by transmission component 908 of FIG. 9.

Process 700 may include additional aspects, such as any single aspect or any combination of aspects described below and/or in connection with one or more other processes described elsewhere herein.

In a first aspect, the first measurement value and the second measure value include an SINR for a respective beam combination.

In a second aspect, alone or in combination with the first aspect, the indication indicates the one or more sets of candidate beams based at least in part on how beam combinations are ordered in the indication.

In a third aspect, alone or in combination with one or more of the first and second aspects, process 700 includes receiving a message from the base station, the message defining how an order of the beam combinations indicates the one or more sets of candidate beams.

In a fourth aspect, alone or in combination with one or more of the first through third aspects, the measurement report indicates the candidate set with an identifier for the candidate set.

In a fifth aspect, alone or in combination with one or more of the first through fourth aspects, the measurement report indicates one or more of a resource indicator for an associated CSI-RS or a resource indicator for an associated SSB or PBCH.

In a sixth aspect, alone or in combination with one or more of the first through fifth aspects, the measurement report indicates the candidate set with an identifier for the CMR of the first beam combination of the candidate set.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
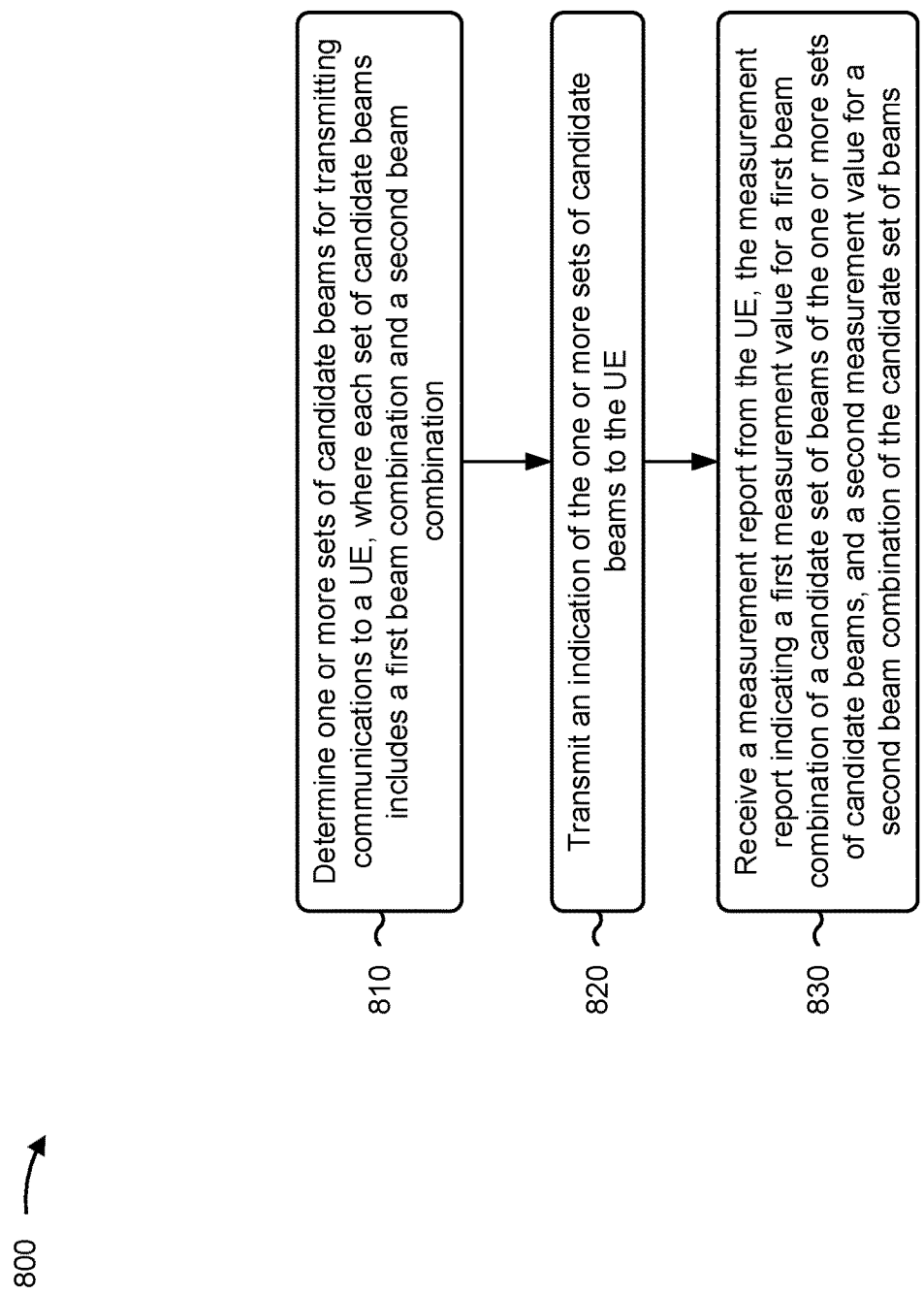
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where the base station (e.g., BS 110 depicted in FIGS. 1 and 2, the gNB depicted in FIG. 3, the TRPs depicted in FIG. 4, BS 510 depicted in FIGS. 5 and 6, and/or the like) performs operations associated with techniques for set based beam reporting.

As shown in FIG. 8, in some aspects, process 800 may include determining one or more sets of candidate beams for transmitting communications to a UE (block 810). For example, the base station (e.g., using transmit processor 220, receive processor 238, controller/processor 240, memory 242, and/or the like) may determine one or more sets of candidate beams for transmitting communications to a UE, as described above. In some aspects, the operation of block 810 may be performed by determination component 1006 of FIG. 10. In some aspects, each set of candidate beams includes a first beam combination and a second beam combination, the first beam combination including a first beam as a CMR and a second beam as an IMR for measuring interference by the second beam on the first beam, and the second beam combination including the second beam as a CMR and the first beam as an IMR.

As further shown in FIG. 8, in some aspects, process 800 may include transmitting an indication of the one or more sets of candidate beams to the UE (block 820). For example, the base station (e.g., using transmit processor 220, receive processor 238, controller/processor 240, memory 242, and/or the like) may transmit an indication of the one or more sets of candidate beams to the UE, as described above. In some aspects, the operation of block 820 may be performed by transmission component 1008 of FIG. 10.

As further shown in FIG. 8, in some aspects, process 800 may include receiving a measurement report from the UE, the measurement report indicating a first measurement value for a first beam combination of a candidate set of beams of the one or more sets of candidate beams, and a second measurement value for a second beam combination of the candidate set of beams (block 830). For example, the base station (e.g., using transmit processor 220, receive processor 238, controller/processor 240, memory 242, and/or the like) may receive a measurement report from the UE, the measurement report indicating a first measurement value for a first beam combination of a candidate set of beams of the one or more sets of candidate beams, and a second measurement value for a second beam combination of the candidate set of beams, as described above. In some aspects, the operation of block 830 may be performed by reception component 1004 of FIG. 10.

Process 800 may include additional aspects, such as any single aspect or any combination of aspects described below and/or in connection with one or more other processes described elsewhere herein.

In a first aspect, the first measurement value and the second measure value include an SINR for a respective beam combination.

In a second aspect, alone or in combination with the first aspect, the indication indicates the one or more sets of candidate beams based at least in part on how beam combinations are ordered in the indication.

In a third aspect, alone or in combination with one or more of the first and second aspects, process 800 includes transmitting a message to the UE, the message defining how an order of the beam combinations indicates the one or more sets of candidate beams.

In a fourth aspect, alone or in combination with one or more of the first through third aspects, the measurement report indicates the candidate set with an identifier for the candidate set.

In a fifth aspect, alone or in combination with one or more of the first through fourth aspects, the measurement report indicates one or more of a resource indicator for an associated CSI-RS or a resource indicator for an associated SSB or PBCH.

In a sixth aspect, alone or in combination with one or more of the first through fifth aspects, the measurement report indicates the candidate set with an identifier for the CMR of the first combination of the candidate set.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
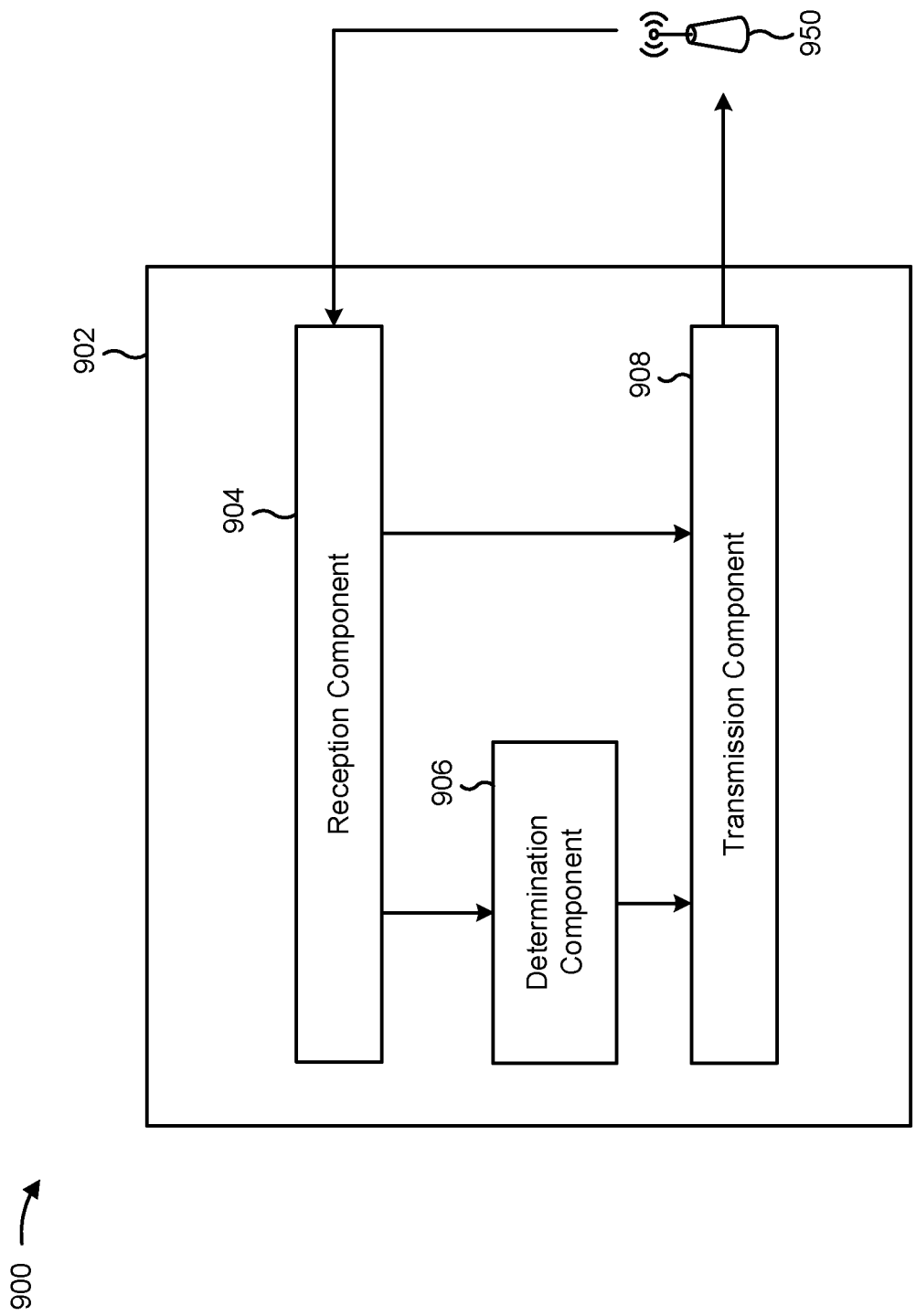
FIG. 9 is a conceptual data flow diagram illustrating a data flow between different components in an example apparatus.

FIG. 9 is a conceptual data flow diagram 900 illustrating a data flow between different components in an example apparatus 902. The apparatus 902 may be a UE (e.g., UE 120). In some aspects, the apparatus 902 includes a reception component 904, a determining component 906, and/or a transmission component 908.

In some aspects, reception component 904 receives, from BS 950, an indication of one or more sets of candidate beams, and passes the indication to determination component 906. Determination component 906 determines measurement values for beam combinations of the sets of candidate beams. Determination component determines a beam candidate set for which to report measurement values. Determination component 906 passes an indication of the beam candidate set and the measurement values to transmission component 908. Transmission component 908 transmits the indication to BS 950.

The apparatus may include additional components that perform each of the blocks of the algorithm in the aforementioned process 700 of FIG. 7, process 800 of FIG. 8, and/or the like. Each block in the aforementioned process 700 of FIG. 7, process 800 of FIG. 8, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

Figure 10:
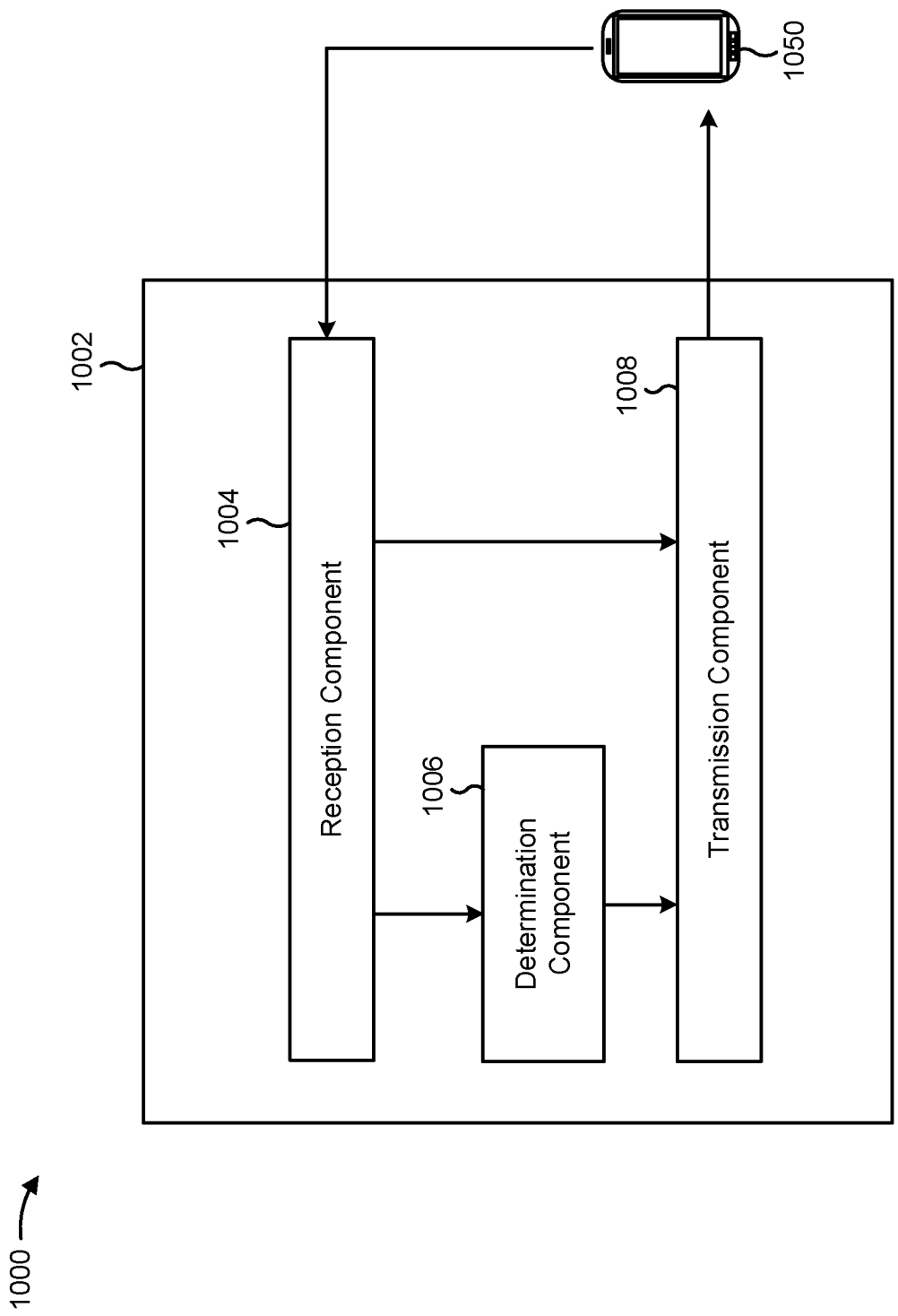
FIG. 10 is a conceptual data flow diagram illustrating a data flow between different components in an example apparatus.

FIG. 10 is a conceptual data flow diagram 1000 illustrating a data flow between different components in an example apparatus 1002. The apparatus 1002 may be a base station (e.g., base station 110). In some aspects, the apparatus 1002 includes a reception component 1004, a determination component 1006, and/or a transmission component 1008.

In some aspects, reception component 1004 receives a message from a UE 1050. Reception component 1004 transmits the message to determination component 1006, which determines one or more sets of candidate beams to send to UE 1050. Determination component 1006 transmits an indication of the sets of candidate beams to transmission component 1008. Transmission component 1008 transmits the indication to UE 1050. Reception component 1004 may receive an indication of measurement values for beam combinations of a determined beam candidate set.

The apparatus may include additional components that perform each of the blocks of the algorithm in the aforementioned process 700 of FIG. 7, process 800 of FIG. 8, and/or the like. Each block in the aforementioned process 700 of FIG. 7, process 800 of FIG. 8, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of components (e.g., one or more components) shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving, from a network entity, an indication of one or more sets of candidate beams, wherein each set of candidate beams includes a first beam combination and a second beam combination, the first beam combination including a first beam as a channel measurement resource (CMR) and a second beam as an interference measurement resource (IMR) for measuring interference by the second beam on the first beam, and the second beam combination including the second beam as a CMR and the first beam as an IMR;

determining, for each of the one or more sets of candidate beams, a measurement value for the first beam combination and a measurement value for the second beam combination;

determining a candidate set of beams, of the one or more sets of candidate beams, to report based at least in part on the measurement values; and transmitting, to the network entity, a measurement report indicating a first measurement value for the first beam combination of the candidate set of beams and a second measurement value for the second beam combination of the candidate set of beams.

2. The method of claim 1, wherein the first measurement value and the second measure value include a signal to interference plus noise ratio for a respective beam combination.

3. The method of claim 1, wherein the indication indicates the one or more sets of candidate beams based at least in part on how beam combinations are ordered in the indication.

4. The method of claim 3, further comprising receiving a message from the network entity, the message defining how an order of the beam combinations indicates the one or more sets of candidate beams.

5. The method of claim 1, wherein the measurement report indicates the candidate set with an identifier for the candidate set.

6. The method of claim 1, wherein the measurement report indicates one or more of a resource indicator for an associated channel state information reference signal or a resource indicator for an associated synchronization signal block or physical broadcast channel.

7. The method of claim 1, wherein the measurement report indicates the candidate set with an identifier for the CMR of the first beam combination of the candidate set of beams.

8. A method of wireless communication performed by a network entity, comprising:

determining one or more sets of candidate beams for transmitting communications to a user equipment (UE), wherein each set of candidate beams includes a first beam combination and a second beam combination, the first beam combination including a first beam as a channel measurement resource (CMR) and a second beam as an interference measurement resource (IMR) for measuring interference by the second beam on the first beam, and the second beam combination including the second beam as a CMR and the first beam as an IMR;

transmitting an indication of the one or more sets of candidate beams to the UE; and receiving a measurement report from the UE, the measurement report indicating a first measurement value for the first beam combination of a candidate set of beams of the one or more sets of candidate beams, and a second measurement value for the second beam combination of the candidate set of beams.

9. The method of claim 8, wherein the first measurement value and the second measure value include a signal to interference plus noise ratio for a respective beam combination.

10. The method of claim 8, wherein the indication indicates the one or more sets of candidate beams based at least in part on how beam combinations are ordered in the indication.

11. The method of claim 10, further comprising transmitting a message to the UE, the message defining how an order of the beam combinations indicates the one or more sets of candidate beams.

12. The method of claim 8, wherein the measurement report indicates the candidate set with an identifier for the candidate set.

13. The method of claim 8, wherein the measurement report indicates one or more of a resource indicator for an associated channel state information reference signal or a resource indicator for an associated synchronization signal block or physical broadcast channel.

14. The method of claim 8, wherein the measurement report indicates the candidate set with an identifier for the CMR of the first beam combination of the candidate set of beams.

15. A user equipment (UE) for wireless communication, comprising:

a memory; and one or more processors coupled to the memory, the one or more processors configured to:

receive, from a network entity, an indication of one or more sets of candidate beams, wherein each set of candidate beams includes a first beam combination and a second beam combination, the first beam combination including a first beam as a channel measurement resource (CMR) and a second beam as an interference measurement resource (IMR) for measuring interference by the second beam on the first beam, and the second beam combination including the second beam as a CMR and the first beam as an IMR;

determine, for each of the one or more sets of candidate beams, a measurement value for the first beam combination and a measurement value for the second beam combination;

determine a candidate set of beams, of the one or more sets of candidate beams, to report based at least in part on the measurement values; and transmit, to the network entity, a measurement report indicating a first measurement value for the first beam combination of the candidate set of beams and a second measurement value for the second beam combination of the candidate set of beams.

16. The UE of claim 15, wherein the first measurement value and the second measurement value include a signal to interference plus noise ratio for a respective beam combination.

17. The UE of claim 15, wherein the indication indicates the one or more sets of candidate beams based at least in part on how beam combinations are ordered in the indication.

18. The UE of claim 17, wherein the the one or more processors are configured to receive a message, from the network entity, the message defining how an order of the beam combinations indicates the one or more sets of candidate beams.

19. The UE of claim 15, wherein the measurement report indicates the candidate set with an identifier for the candidate set.

20. The UE of claim 15, wherein the measurement report indicates one or more of a resource indicator for an associated channel state information reference signal or a resource indicator for an associated synchronization signal block or physical broadcast channel.

21. The UE of claim 15, wherein the measurement report indicates the candidate set with an identifier for the CMR of the first beam combination of the candidate set of beams.

22. A network entity for wireless communication, comprising:
a memory; and
one or more processors coupled to the memory, the one or more processors configured to:
determine one or more sets of candidate beams for transmitting communications to a user equipment (UE), wherein each set of candidate beams includes a first beam combination and a second beam combination, the first beam combination including a first beam as a channel measurement resource (CMR) and a second beam as an interference measurement resource (IMR) for measuring interference by the second beam on the first beam, and the second beam combination including the second beam as a CMR and the first beam as an IMR;
transmit an indication of the one or more sets of candidate beams to the UE; and
receive a measurement report from the UE, the measurement report indicating a first measurement value for the first beam combination of a candidate set of beams of the one or more sets of candidate beams, and a second measurement value for the second beam combination of the candidate set of beams.

23. The network entity of claim 22, wherein the first measurement value and the second measure value include a signal to interference plus noise ratio for a respective beam combination.

24. The network entity of claim 22, wherein the indication indicates the one or more sets of candidate beams based at least in part on how beam combinations are ordered in the indication.

25. The network entity of claim 24, wherein memory and the one or more processors are configured to transmit a message to the UE, the message defining how an order of the beam combinations indicates the one or more sets of candidate beams.

26. The network entity of claim 22, wherein the measurement report indicates the candidate set with an identifier for the candidate set.

27. The network entity of claim 22, wherein the measurement report indicates one or more of a resource indicator for an associated channel state information reference signal or a resource indicator for an associated synchronization signal block or physical broadcast channel.

28. The network entity of claim 22, wherein the measurement report indicates the candidate set with an identifier for the CMR of the first beam combination of the candidate set of beams.

* * * * *